United States Patent [19]

Dalpane

[11] Patent Number: 4,788,999
[45] Date of Patent: Dec. 6, 1988

[54] AUTOMATIC SERVO-CONTROLLED VALVE WITH HIGH-SPEED OPENING

[75] Inventor: Luigi Dalpane, Chiavari, Italy

[73] Assignees: Ansaldo S.p.A., Genoa; ENEA Comitato Nazionale per la Ricerca e lo Sviluppo dell'Energia Nucleare e delle Energie Alternative, Rome, both of Italy

[21] Appl. No.: 72,273

[22] Filed: Jul. 9, 1987

[30] Foreign Application Priority Data

Jul. 14, 1986 [IT] Italy ................................ 12512 A/86

[51] Int. Cl.⁴ .............................................. B65D 51/16
[52] U.S. Cl. .................................... 137/514; 137/467; 137/521; 137/587; 220/315; 220/324; 220/326; 220/335
[58] Field of Search ............ 137/467, 514, 521, 527.6, 137/527.8, 587, 527; 251/297; 220/315, 324, 326, 335

[56] References Cited

U.S. PATENT DOCUMENTS

| 1,233,028 | 7/1917 | Clifton et al. | 137/587 |
| 1,346,887 | 7/1920 | Heald | 137/514 |
| 2,045,518 | 6/1936 | Chatfield | 137/527 |
| 2,745,627 | 5/1956 | Winfree | 251/297 |
| 3,113,172 | 12/1963 | Barr | 137/467 X |
| 4,109,819 | 8/1978 | Kushman et al. | 137/527 X |
| 4,263,935 | 4/1981 | Regnier | 137/587 |
| 4,585,139 | 4/1986 | Bronson et al. | 220/335 X |

Primary Examiner—John Rivell
Attorney, Agent, or Firm—Emmanuel J. Lobato; Robert E. Burns

[57] ABSTRACT

The object of the invention is an automatic servo-controlled valve with high speed opening wherein the shutter is a hinged cover (20). Suitable locking means (30, 50) keep the cover (20) in a locked position up to the time when the pressure difference on the two faces of the cover exceeds a pre-determined minimum level. After the said locking means have moved to an open position, an actuator (40) operates the opening of the said cover at high speed (FIG. 1).

8 Claims, 4 Drawing Sheets

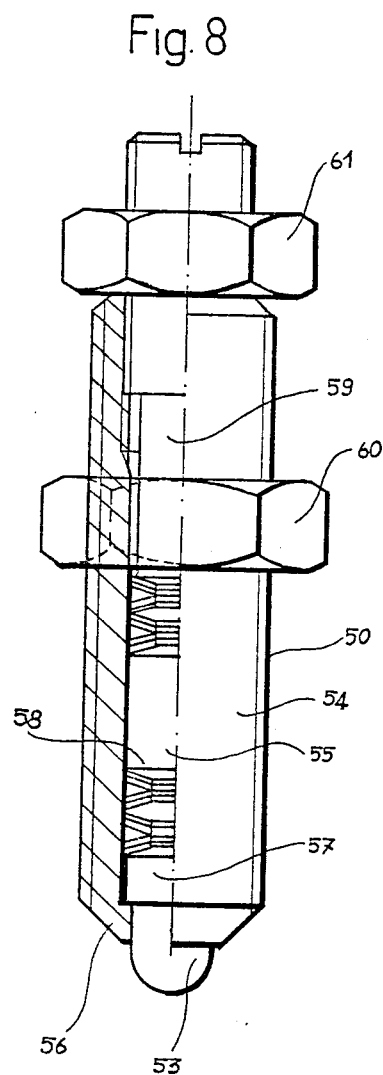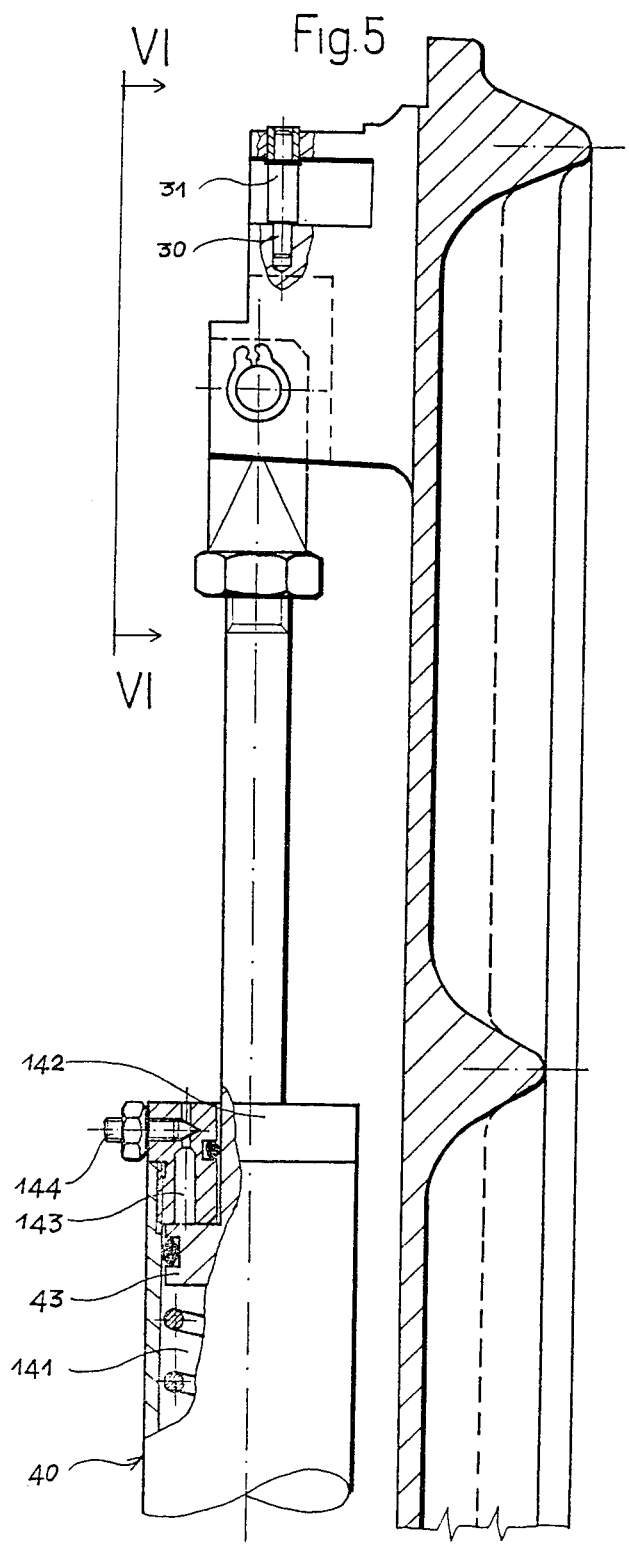

AUTOMATIC SERVO-CONTROLLED VALVE WITH HIGH-SPEED OPENING

BACKGROUND OF THE INVENTION

The object of this invention is an automatic servo-controlled valve with high speed opening for the outlet of gas.

It is known that in industrial plants in general, and nuclear plants in particular, there are premises where a sudden and uncontrollable increase of pressure may take place, because of fire, explosions, gas or steam escape, and the like.

To prevent such pressure increases it is necessary to provide for quick breaking diaphragms so as to allow the gas to escape.

The main disadvantage of such quick-breaking diaphragms is that, after their operation, i.e. after their breakage, they must be substituted: hence they can be used only once. Apart from the economic aspect brought about by the diaphragm substitution, it is clear that they can be calibrated on a statistical basis only, by causing the breakage of some of the diaphragms that are to be installed in the plant concerned.

Moreover, if very large escape areas are required for very low differential operating pressures, and even though special materials are used, a limit of incompatibility is soon reached between the high sensitivity and the stability requirements (acceptability of the risk of improper diaphragm breakage).

BRIEF SUMMARY OF THE INVENTION

The object of this invention is to obviate the said disadvantage by means of a servo-controlled automatic valve, which is normally closed.

The said valve comprises a fixed frame and a hinged cover which is kept in a closed position by locking means, and, after the opening of the said locking means, is pushed to an open position by an appropriate actuator.

The said locking means are sensitive to pressure or, more precisely, to the pressure difference between the two separate chambers of the valve. They are with at least one check pin, which is integral with the cover, and is therefore pushed by the pressure acting on the cover against at least one sliding bolt, from an extracted lock position of the check pin to a retracted release position of same, thus overcoming the force of calibratable springs.

According to the invention, the tangent to the contact surfaces between the check pin and the sliding bolt is at an angle with the displacement direction of either and/or both members.

The actuator pushing the valve cover into the opening position consists of a cylinder with an inner piston contrasting a spring or a pressurized fluid; it is moreover provided whit damping means, for slowing down the speed of the valve cover during the finale stage of its stroke.

Suitable regulating means will permit to vary both the speed and the acceleration caused by the actuator to the valve cover.

The above mentioned locking means are moreover provided with regulators capable of varying the minimum operating pressure of the valve, which can be lowered as required.

It is clear that the difference in the minimum pressure acting on both faces of the valve cover can be lowered as required by increasing the valve cutter surface, by decreasing the pre-load of calibrated springs acting on the sliding bolt, and, finally, by reducing the coefficient of friction between the surfaces in contact with the check pin, on one hand, and the sliding bolt, on the other.

The friction coefficient reduction can be emphasized by introducing contact means capable of causing a rolling friction instead of a sliding friction.

BRIEF DESCRIPTION OF DRAWINGS

FIGS. 3, 4 and 5 are sections, along the mirror symmetry plane of the valve, of the details identified by boxes III, IV and V of FIG. 1, on a larger scale;

FIG. 8 is a partially sectional view of a detail of the sliding bolt already shown in FIG. 7.

DETAILED DESCRIPTION OF PREFERRED EMBODIMENT

Figure 1:
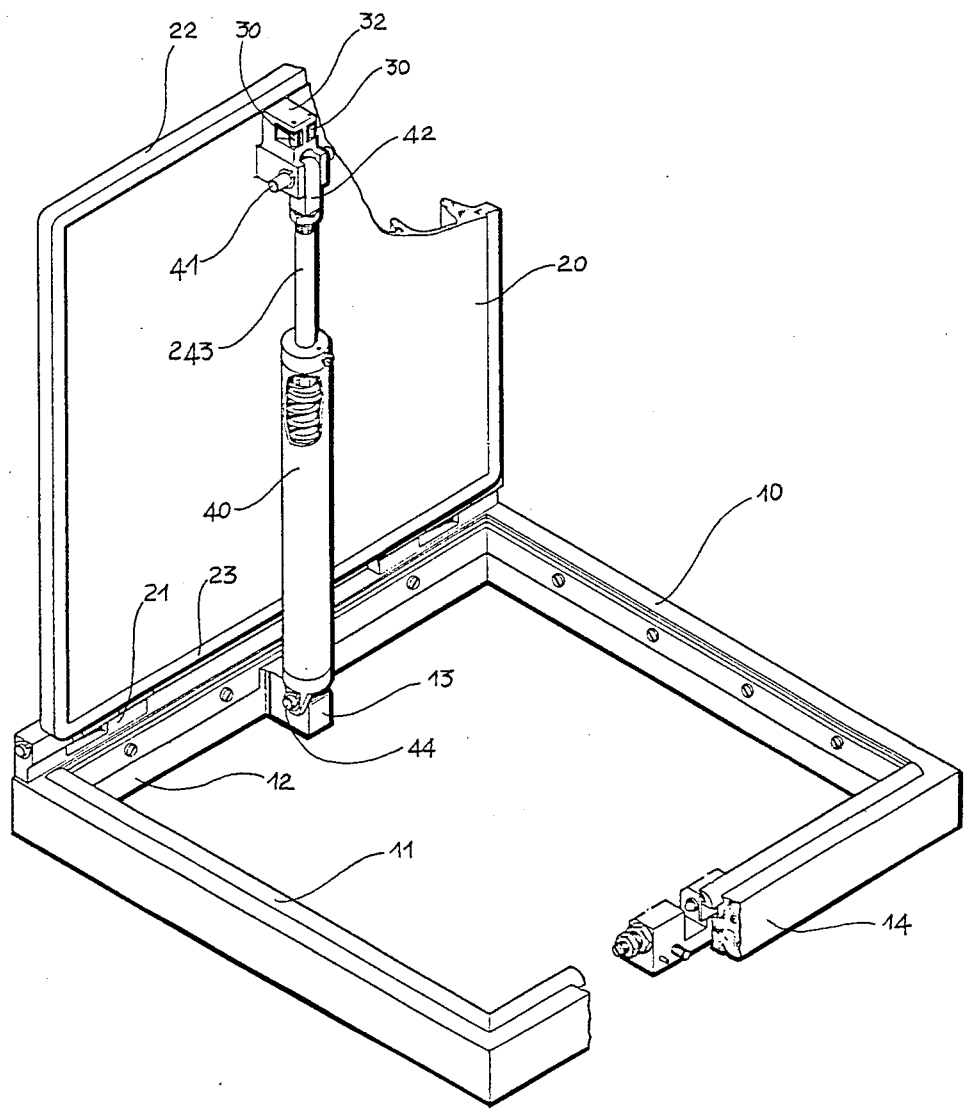
FIG. 1 is an overall perspective view of the valve according to the invention.
Figure 2:
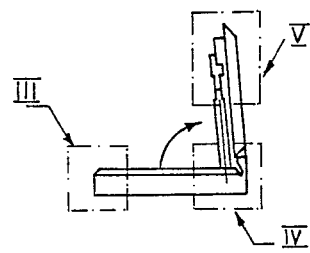
FIG. 2 is a side view of the valve according to the invention, in an open position, as in FIG. 1, but on a smaller scale.
Figure 6:
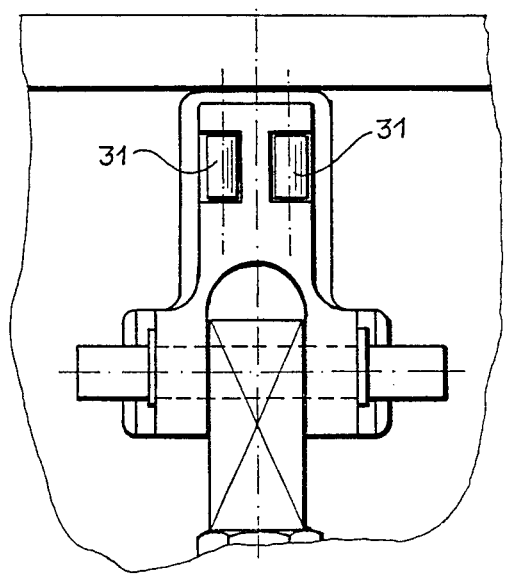
FIG. 6 is a view taken along plane VI—VI of FIG. 5.

With particular reference to the said figures: No. 10 identifies the basic frame of the valve according to the invention, which must be steadily and tightly connected to the wall of the chamber, the internal pressure of which should be controlled.

No. 20 identifies a cover, fastened and jointed to one of the sides of frame 10 by means of hinge 21.

Moreover, a seal 11 is provided on the profile of frame 10, such seal to be compressed by the edge of cover 20 when the latter is in a closed position, so as to make it air tight. The locking means of the closed cover, in the embodiment shown, consist of a couple of check pins 30, with free turning bushes 31 mounted thereon, which, as will be shown in detail hereinafter, are apt to operate as friction reducing means, so as to reduce the minimum operating pressure of the valve according to the invention.

Check pins 30 are supported by a support 32, projecting from the inner face of cover 20 and located near side 22 of cover 20, opposite to side 23, which is provided with hinges 21. On the same support 32 there is mounted a pin 41 with the end 42 of the rod 243 of piston 43 of operating cylinder 40 hinged thereto. (see FIGS. 1 and 5).

The said cylinder is hinged, at the other end, to a pin 44 supported by a bracket 13 projecting from the inner face of side 12 of frame 10.

When cover 20 is in a closed position, piston 43 is in a retracted position and loads a spring, whereas in the open position shown in FIG. 1 the cylinder piston 43 is in an extracted position. As will be seen in detail further on, the cylinder controls the opening of cover 20 when its locking means move to an open position.

The said locking means, besides being provided with check pins 30 mounted on cover 20, are also provided with at least one sliding bolt 50 mounted on side 14 of frame 10, which is opposite to side 12, as specified above.

In the embodiment shown in the figures, there are two sliding bolts, symmetrically positioned and fit to operate each in combination with a check pin 30.

Figure 7:
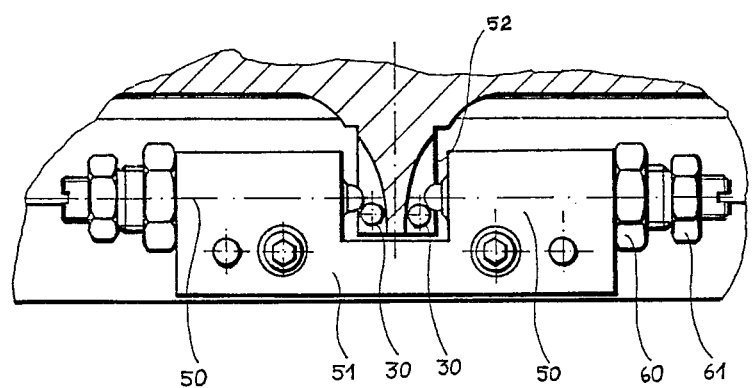
FIG. 7 is a view taken along plane VII—VII of FIG. 3.
Figure 3:
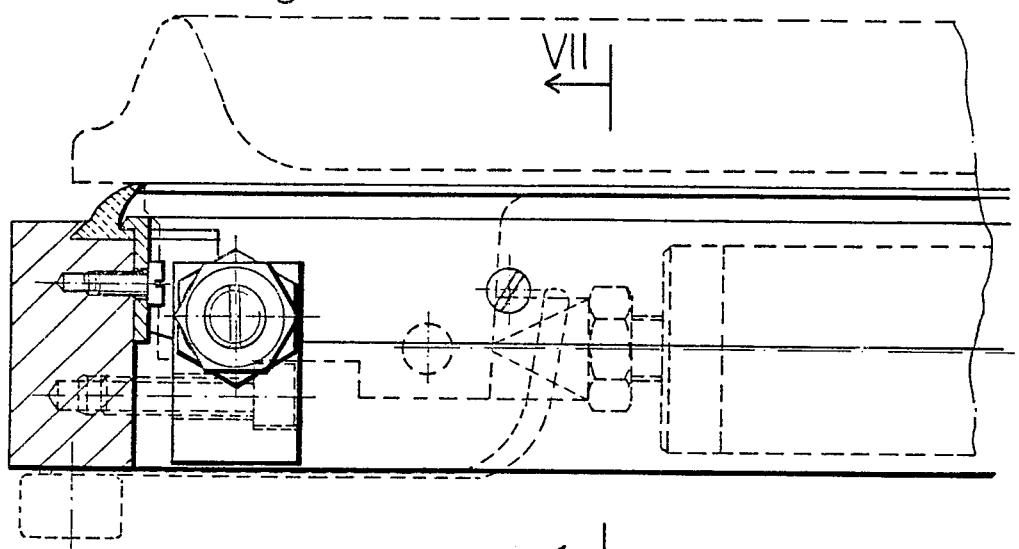
Figure 4:
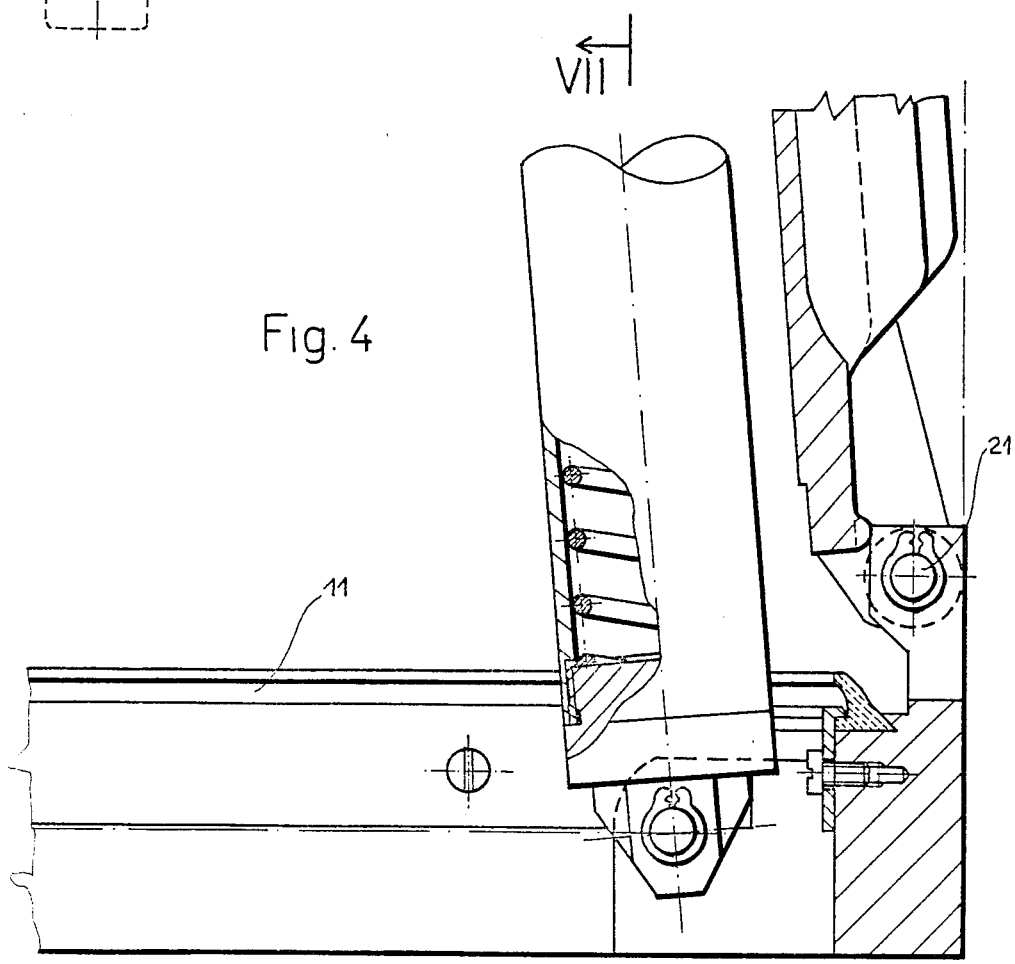

The two sliding bolts 50 are mounted on a common support 51 wherein there is a cavity 52 (see FIG. 7).

The ferrules 53 of the two sliding bolts protrude into the said cavity, and in the closed position of cover 20, the two check pins 30 are housed in the said cavity.

As shown in FIG. 7, when cover 20 is in a closed and locked position, the ferrules 53 of sliding bolts 50 detain the check pins 30.

As shown in detail in FIG. 8, sliding bolt 50 is formed by a ferrule 53 slidingly mounted inside a tubular body 54, threaded externally so as to be screwed onto a corresponding threaded hole of support 51.

The end of axial hole 55 of tubular body 54 is provided with an inner flange 56, acting as a beat for an external flange 57 of ferrule 53.

Ferrule 53 is elastically pushed outwards by spring 58, which in this instance are Belleville washers suitably piled.

The compression of Belleville washers 58 is defined by a threaded pin 59 screwed inside the hole 55 at the other end of tubular body 54, opposite to ferrule 53.

The purpose of nut 60 is to lock the tubular body 54, screwed into the corresponding hole of support 51 in the required axial position. On the other hand, the purpose of nut 61 to fasten the relative position of threaded pin 59 into hole 55, and then maintain the required compression of Belleville washers 58.

It is now clear that the force required to move backward ferrule 53 from bolt 50 can be regulated continuously and with great accuracy.

When in the premise closed by the valve forming the object of this claim there happens to be a superpressure over the outer environment, check pins 30 lean against ferrules 53 of sliding bolts 50, and apply a force proportional to the surface of cover 20 and to the said overpressure.

The opening of locking means 30-50 is obtained by the backward movement of sliding bolts 50, or, rather the backward movement of ferrules 53.

To have ferrules 53 move backward when the said overpressure reaches a pre-established level, check pins 30 and ferrules 53 have sloping contact surfaces, so that the force applied by pins 30 to ferrules 53 of sliding bolts 50 comprises a component which is parallel to the axis of the said bolts. When the overpressure acting on the inner face of cover 20 increases, there is a proportional increase in the force applied by check pins 30 to ferrules 53, and correspondingly in the component of the said force, parallel to the ferrule axis.

When the said component exceeds the pre-loading condition of Belleville washers 58, the ferrules move backward, and the locking means 30-50 move to an open position. At this point, the pre-loaded cylinder 40 commands the high-speed opening of the valve, by causing the cover to overturn.

According to the invention, it is possiible to bring the valve opening overpressure to very low values as compared to those of diaphragm valves of known type.

According to the invention, the said minimum pressure can be lowered to one hundredth of a bar, and even less.

Various factors can be acted upon to obtain such reduction in the valve operating pressure.

One can increase the valve size, thus achieving a great force, applied by check pins 30 to ferrules 53 of sliding bolts 50.

One can also lower the valve opening overpressure by reducing the load upon springs 58 of sliding bolts 50.

It is also possible to increase the axial component of the force acting on ferrules 53, by acting on the tangent angle of the contact surfaces of the ferrules, as well as on those of the check pins.

Moreover, as can be seen from the embodiment shown in the drawings, one can transform the sliding friction between ferrule 53 and check pin 30 into rolling friction, by means of bushing 31, revolvingly mounted on check pins 30.

It is thus possible to achieve not only a further reduction of the pressure at the valve opening, but also, and above all, a close tolerance of the valve operating overpressure value, thanks to the fact that the rolling friction brings about smoother operating conditions.

As previously said, valves according to the present invention should be endowed with high opening speed; to this end, when the piston according to the invention is a retracted position it is elastically loaded, and consequently, as soon as the locking means 30-50 are open, it will quickly push cover 20 out.

To this end, the cylinder may be pre-loaded with springs or with a pressurized fluid.

The use of a pressurized fluid permits a high opening speed in the initial stage, when the fluid pressure in the cylinder 40 being still high, the force applied by the corresponding piston to rod 243, and by the latter to cover 20, is correspondingly high.

By and by the cylinder pushes rod 243 outwards, the pressure of the fluid compressed in the cylinder work chamber decreases, and so does the overturn force applied the piston. The rotation speed at the opening of cover 20 decreases correspondingly, which does not mean that the efficiency of the valve is reduced, in view of the fact that the increase section of the valve passage decreases during the final overturn stage, when the cover is open. Therefore, not only is the reduction of the cover opening speed during the final stage of the stroke not damaging; it is actually advisable, as it prevents the cover during the final stage of its stroke from knocking bluntly against and damage hinges 21.

To this end, as shown in FIG. 5, piston 43 of cylinder 40 defines two chambers inside cylinder 40. The first chamber (141), or work chamber, (at the bottom in FIG. 5) contains a spring or a compressed fluid; whereas the second chamber (top in FIG. 5) contains air at ambient pressure flowing from the passage 143 positioned on the upper wall (142) of cylinder 40. By and by piston 43 moves upwards, the pressure in the upper chamber grows, in spite of the hole 143, and (particularly in the last stage of the stroke of piston 43, when the valve passage section approaches the maximum section) it hinders and then slows down the stroke piston speed, acting as a damping means.

Such damping effect can be regulated by closing the said passage hole 143 to a greater or smaller extent by means of a threaded pin 144 with a cone-shaped point.

Therefore, according to the invention, not only is it possible to regulate the valve operating pressure as desired, whithin large limits, lowering it below the values provided for by known devices having the same object, but it is also possible to achieve a high opening speed in the initial valve opening stage, and a progressively decreasing speed to prevent the mechanical members of the valve from getting knocked during the final stage of the opening stroke, when the passage section increase is almost negligible.

What I claim is:

1. An automatic quick-release vent and pressure-relief valve structure comprising, a frame secured in use around an opening through which gases under pressure are vented to relieve the pressure thereof, a cover pivotally mounted on the frame movable to a closed position on the frame for closing the opening and movable to an open position in which said opening is opened, a lock mechanism comprising a locking pin fixed to an underside of the cover to which said gases apply pressure in a direction toward opening the cover, said lock mechanism further including a lock device having a slide bolt overlying the locking pin holding the cover on the frame in a closed position, said lock device having variably adjustable biasing means for variably biasing the slide bolt to an extracted position overlying said locking pin to hold the cover closed, said locking pin and slide bolt having surfaces coactive and effectively in response to pressure of gases on said cover developing a force component axially of the slide bolt against biasing pressure of said biasing means for effecting release in response to said pressure on the underside of the cover, and an automatic a activator biasing the closed clover to an open position automatically opening the cover when said slide bolt is retracted.

2. An automatic quick-release vent and pressure-relief valve structure according to claim 1, in which said activator is a cylinder jack.

3. An automatic quick-release vent and pressure-relief valve structure according to claim 2, in which said cylinder jack is activated by a fluid under pressure.

4. An automatic quick-release vent and pressure-relief valve structure according to claim 3, in which said cylinder jack has a piston and rod connected to said cover, said cylinder jack including means for dampening a stroke of the piston and rod at a final stage of opening of the cover.

5. An automatic quick-release vent and pressure-relief valve structure according to claim 1, in which said locking pin and slide bolt are disposed 90° to each other, and in which said locking pin and slide bolt surfaces are arcuate surfaces in contact with each other.

6. An automatic quick-release vent and pressure-relief valve structure according to claim 5, in which said locking pin and slide bolt are circular in cross section.

7. An automatic quick-release vent and pressure-relief valve structure according to claim 1, in which said cover is seated on said frame when closed, and in which said activator biases said cover continuously when closed toward said open position.

8. An automatic quick-release vent and pressure-relief valve structure according to claim 1, in which said activator is a spring-loaded activator

* * * * *